United States Patent [19]
Kanazawa et al.

[11] Patent Number: 5,812,727
[45] Date of Patent: Sep. 22, 1998

[54] HOLDER FOR OPTICAL FIBERS IN A SCANNING OPTICAL DEVICE

[75] Inventors: Hiroshi Kanazawa; Tadashi Minakuchi; Masahiro Oono; Mitsunori Iima, all of Tokyo, Japan

[73] Assignee: Asahi Kogaku Kogyo Kabushiki Kaisha, Tokyo, Japan

[21] Appl. No.: 791,963

[22] Filed: Jan. 31, 1997

[30] Foreign Application Priority Data

Jan. 31, 1996 [JP] Japan .................................. 8-037269

[51] Int. Cl.⁶ ...................................................... G02B 6/00
[52] U.S. Cl. ...................... 385/137; 385/134; 385/135; 385/25; 385/33
[58] Field of Search .................................. 385/14, 15, 16, 385/17, 24, 25, 33, 35, 52, 88, 89, 134, 135, 137, 147

[56] References Cited

U.S. PATENT DOCUMENTS

| | | | |
|---|---|---|---|
| 4,861,134 | 8/1989 | Alameel et al. | 385/135 X |
| 4,941,720 | 7/1990 | Bartwig et al. | 385/135 X |
| 5,131,066 | 7/1992 | Foss | 385/135 |
| 5,138,688 | 8/1992 | Debortoli | 385/135 |
| 5,167,001 | 11/1992 | Debortoli et al. | 385/135 |
| 5,185,846 | 2/1993 | Basavanhally et al. | 385/137 |
| 5,216,741 | 6/1993 | Blijleven et al. | 385/137 |
| 5,235,665 | 8/1993 | Marchesi et al. | 385/135 |
| 5,335,304 | 8/1994 | Smith et al. | 385/135 |
| 5,469,526 | 11/1995 | Rawlings | 385/135 |

FOREIGN PATENT DOCUMENTS

| | | | |
|---|---|---|---|
| 2198413 | 8/1990 | Japan | 385/147 X |
| 2240617 | 9/1990 | Japan | 385/147 X |
| 2140510 | 11/1990 | Japan | 385/33 X |

Primary Examiner—Brian Healy
Attorney, Agent, or Firm—Greenblum & Bernstein, P.L.C.

[57] ABSTRACT

A multi-beam scanning optical device uses optical fibers to transmit the laser fluxes from the semiconductor lasers. The optical fibers are arranged such that point light sources formed at respective exit ends of the optical fibers are linearly aligned. The exit light fluxes from the optical fibers are deflected by a polygon mirror and converged on an image surface to form a line of beam spots, which forms plurality of scanning lines per scan.

In order to adjust the angle of the line of beam spots, the exit end portions of the optical fibers is fixed to a fiber alignment block such that the exit end surfaces of said optical fiber are linearly aligned on an alignment line. Further, the fiber alignment block is fixed to a cylindrical member which is rotatably supported by a supporting member. Accordingly, the angle of the line of beam spots can be easily adjusted by rotating the cylindrical member.

14 Claims, 11 Drawing Sheets

HOLDER FOR OPTICAL FIBERS IN A SCANNING OPTICAL DEVICE

BACKGROUND OF THE INVENTION

The present invention relates to a holder for optical fibers in a scanning optical device. In particular, the present invention relates to a holder that aligns the optical fibers in a straight line and allows the adjustment of the direction of the straight line.

A multi-beam scanning optical device forms a plurality of scanning lines per scan using a plurality of light fluxes. The light fluxes may be provided by a monolithic multiple-beam semiconductor laser or by a plurality of single-beam semiconductor lasers.

Since the number of light emitting points of the monolithic multiple-beam semiconductor laser is limited to two or three for commercially available products, in order to form four or more scanning lines per scan, the light fluxes must be provided by a plurality of single-beam semiconductor lasers.

When a plurality of lasers are used, a plurality of optical fibers may be used to transmit the laser fluxes from the plurality of semiconductor lasers. Generally, the exit ends of the optical fibers will be arranged such that point light sources formed at the exit ends are linearly aligned. The exit light fluxes from the optical fibers are deflected by a polygon mirror and converged on an image surface through a scanning lens to form a line of beam spots, which forms a plurality of scanning lines per scan.

Since the core diameter of a conventional optical fiber is several microns and the cladding diameter is several tens of microns, some clearance will be produced between respective point light sources even if the optical fibers are arranged to contact with adjacent optical fibers. Thus, if the optical fibers are arranged so that the line of the beam spots are perpendicular to the scanning line, some clearance will also be produced between the adjacent beam spots formed on the image surface. Accordingly, the optical fibers should be arranged so that the line of the beam spots makes a predetermined angle with respect to the direction of the scanning line.

As a result of the arrangement, the beam spots on the image surface are separated in both a main scanning direction and an auxiliary scanning direction (i.e. in directions parallel to and perpendicular to the scanning line, respectively).

Although it is desirable that the angle of the alignment line of the point light sources be adjustable in order to adjust the angle of the line of the beam spots thereby to adjust the distance between adjacent scanning lines, the conventional multi-beam scanning device does not include any adjusting mechanism to adjust the angle of the alignment line of the point light sources.

SUMMARY OF THE INVENTION

It is therefore an object of the present invention to provide a holder that holds exit ends of optical fibers and that enables the adjustment of the angle of the alignment line of the point light sources.

According to an aspect of the present invention, the holder of the optical fibers in a scanning optical device include a fiber alignment block that holds the exit end portions of the optical fibers through which light fluxes from light sources are transmitted, the optical fibers being held such that the exit end surfaces of the optical fiber are linearly aligned, a cylindrical member to which the fiber alignment block is fixed, wherein the direction of the exit light fluxes from the optical fibers are parallel to a generatrix of the cylindrical member, and a supporting member that supports the cylindrical portion so as to allow the rotation of the cylindrical member about a rotating axis parallel to a generatrix of the cylindrical member. As constructed above, the angle of the point light sources can be easily adjusted by rotating the cylindrical member, so that the angle of the line of beam spots with respect to the scanning direction is set. It is preferred that axes of respective exit end portions of the optical fibers are parallel with each other and aligned on a flat plane.

In a preferred embodiment, the center of the fibers on the alignment line substantially coincides with the rotating axis. Preferably, the cylindrical member defines a circular hole along the rotating axis, such that light fluxes from the optical fibers pass through the circular hole. Further, the cylindrical member further holds a collimator lens in the circular hole, such that light fluxes are transmitted through the collimator lens.

In another preferred embodiment, the supporting member includes a base member that contacts with the cylindrical member and a fixing member that fixes the cylindrical member to the base member optionally, the base member comprises two contact surfaces that are perpendicular to each other and the cylindrical member contacts with both of the contact surfaces.

According to another aspect of the invention, a multi-beam scanning optical device includes a plurality of light emitting elements; a plurality of optical fibers for transmitting light fluxes emitted from the respective light emitting elements; a fiber alignment block that holds the exit end portions of the optical fibers, the optical fibers being held such that the exit end surfaces of the optical fiber are linearly aligned; a cylindrical member to which the fiber alignment block is fixed, wherein the direction of the exit light fluxes from the optical fibers are parallel to a generatrix of the cylindrical member; a supporting member that supports the cylindrical portion so as to allow the rotation of the cylindrical member about a rotating axis parallel to a generatrix of the cylindrical member; a deflector for deflecting the light flux transmitted through the optical fiber; and a scanning lens system for converging the deflected light flux to form a scanning line on an image surface.

In a particular arrangement, the scanning optical device further includes an angle detecting unit. The angle detecting unit includes a reflecting surface that rotates with the cylindrical member, a light source for emitting a detection light toward the reflecting surface and a photodetector to detect a position of the reflected light from the reflecting surface.

DETAILED DESCRIPTION OF THE PREFERRED EMBODIMENTS

A holder for optical fibers in a scanning optical device according to the present embodiment is described with reference to FIGS. 1 through 11. The embodiment described is directed to a multi-beam scanning optical device that scans a plurality of laser fluxes across a predetermined angle producing eight scanning lines per scan on a surface, such as the surface of a photoconductive member.

Figure 1:
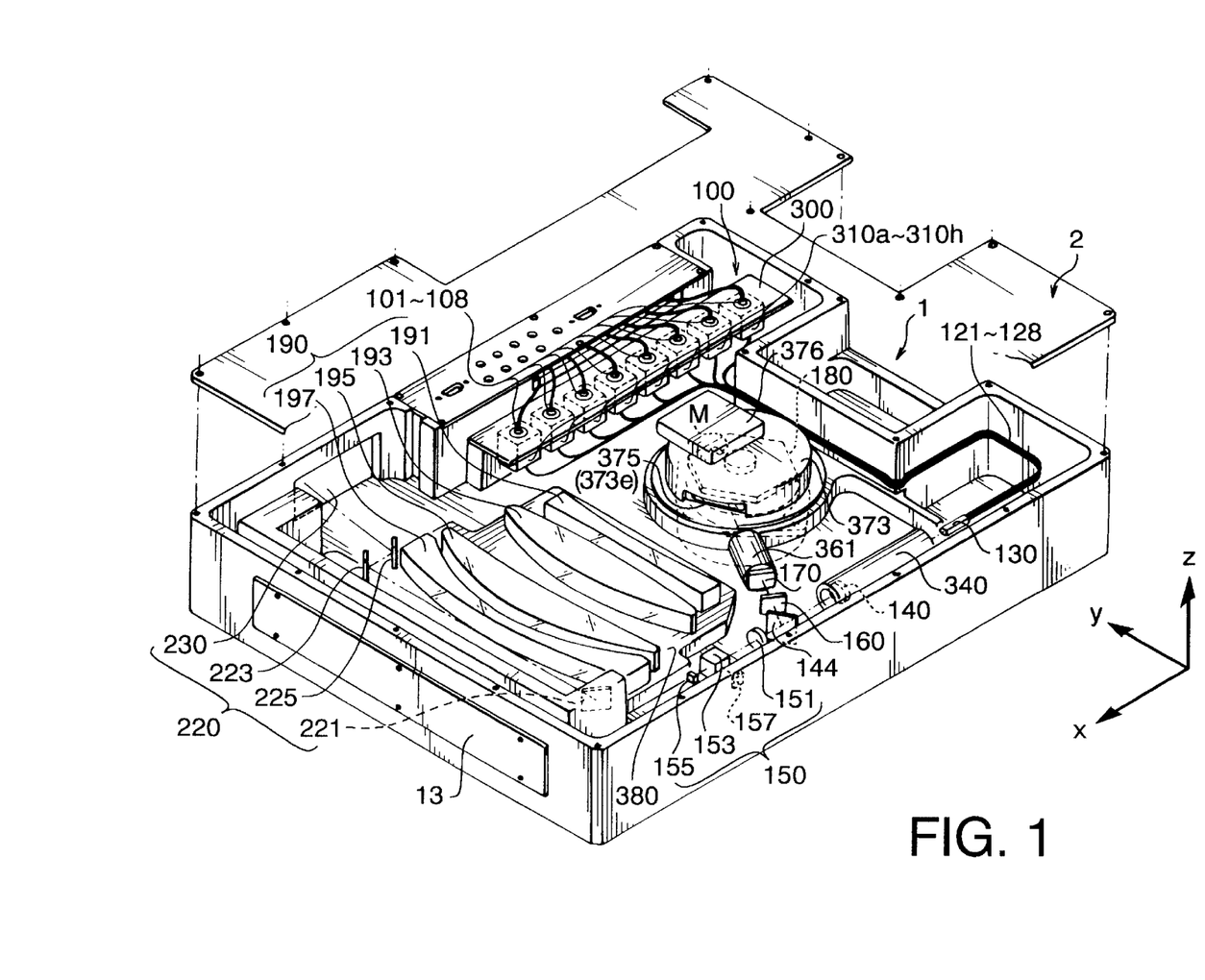
FIG. 1 is a perspective view showing a scanning optical device.
Figure 2:
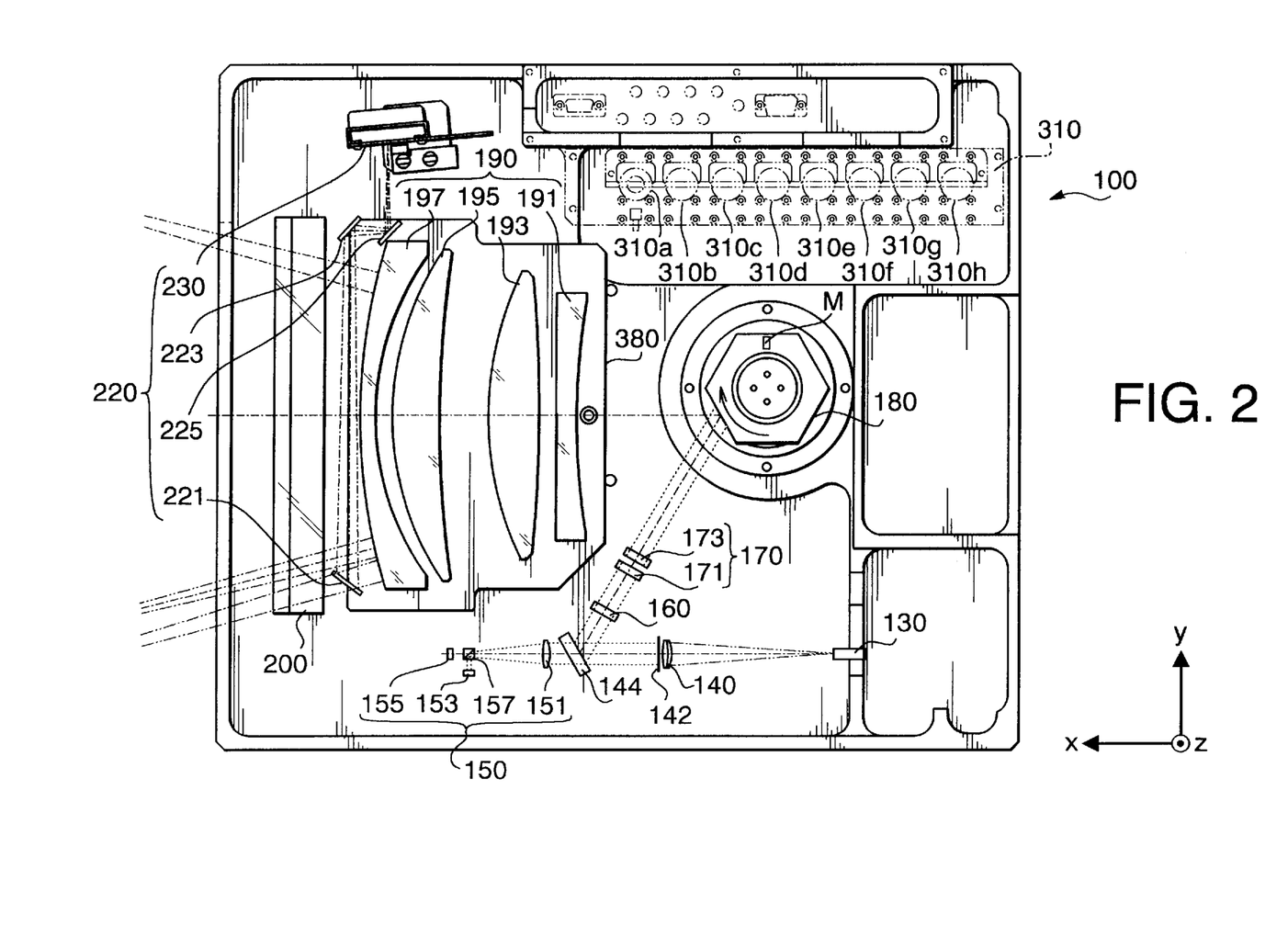
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
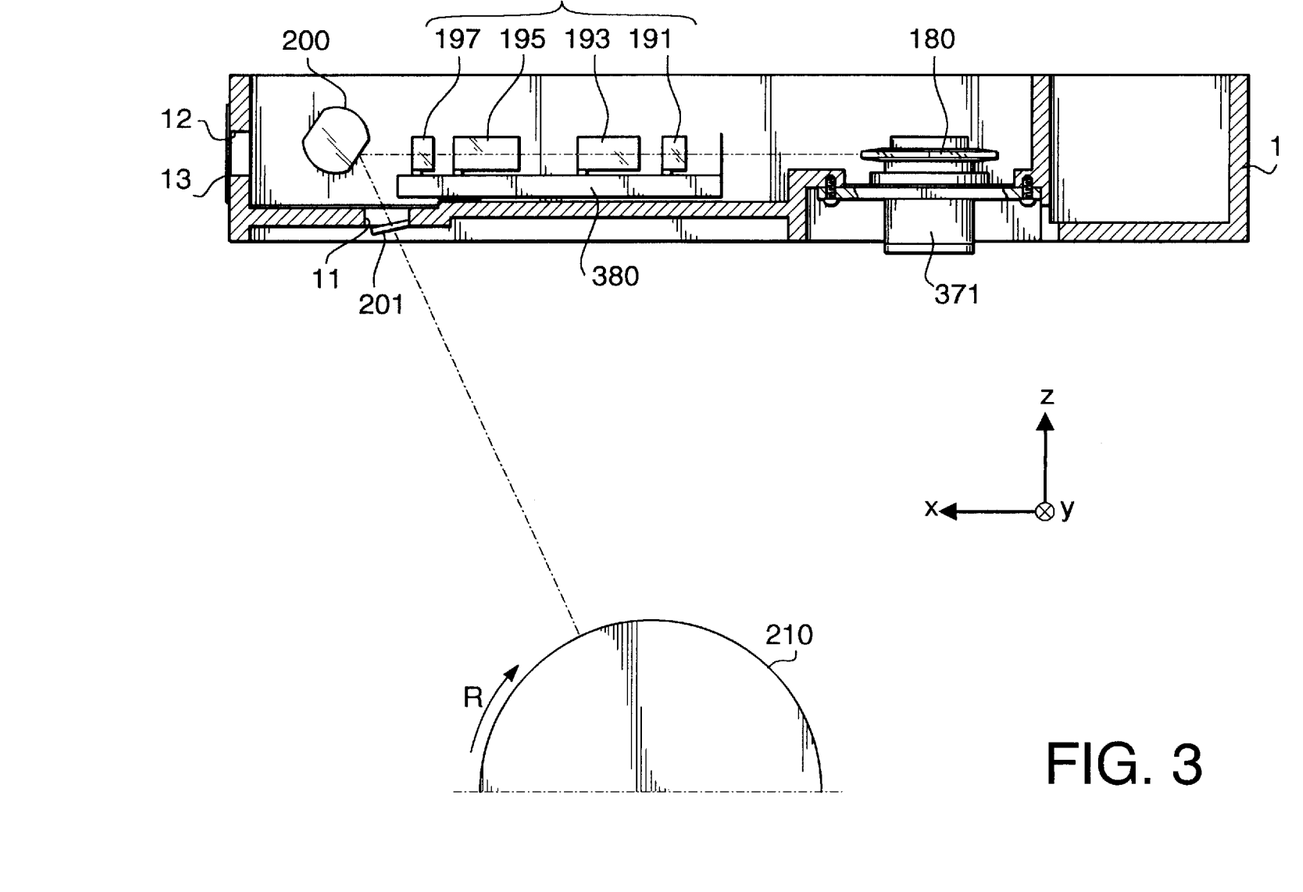
FIG. 3 is a cross-sectional view of the scanning optical device shown in FIG. 1 in an auxiliary scanning direction.
Figure 4:
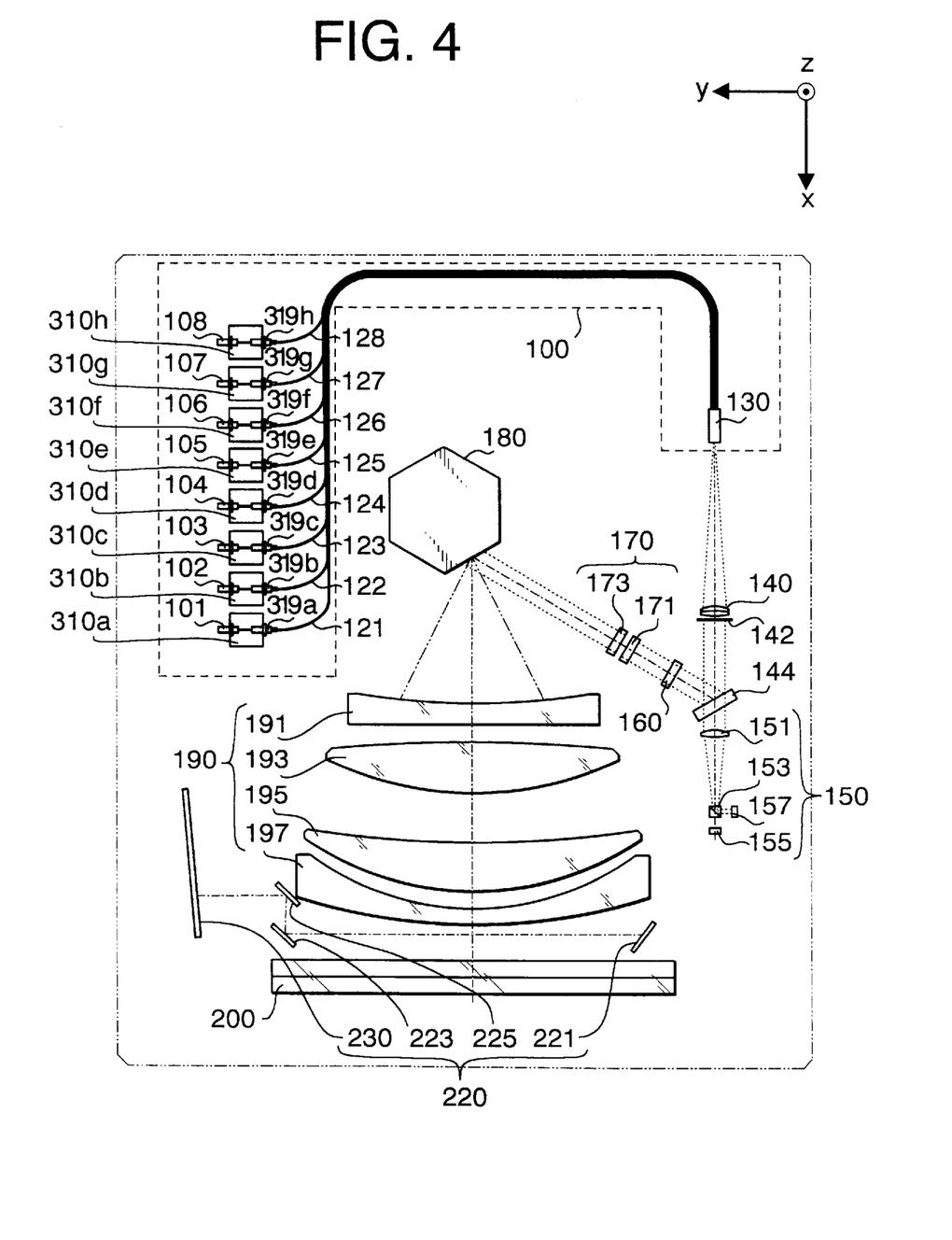
FIG. 4 shows the optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight laser fluxes are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a laser flux scans across the surface of a photoconductive member, and an "auxiliary scanning directions" is a direction in which the photoconductive member is translated or rotated to position the member for a subsequent main scan. The main scanning and auxiliary scanning directions are perpendicular to one another, and are both perpendicular to the optical axes of lenses guiding the laser fluxes. Since a laser flux typically is reflected or "folded" several times in the transmission from the light source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective laser fluxes are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point light sources are formed in a straight line.

A diverging light flux emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the light flux emitted from the collimate lens 140.

The light flux that passes through the aperture 142 is directed to a beam splitter 144. The beam splitter 144 splits the light flux causing a part of the light flux to be transmitted as a monitor light flux and the remaining part to be reflected as a main light flux. The transmissivity of the beam splitter 144 (i.e., the amount of light transmitted as a monitor flux) is, for example, from 5 to 10 percent as a mean value of S polarized light and P polarized light.

The monitor light flux is directed into an automatic power control (APC) sensor system 150. The APC sensor system 150 includes a collective lens 151 for converging the monitor flux; a polarization beam splitter 153 which splits the light flux into two linear polarization components that are orthogonal to each other; a first APC light receiving element 155; and a second APC light receiving element 157.

The first and second APC light receiving elements 155 and 157 detect the light energy of the respective linear polarization components, and the output of the light receiving elements 155 and 157 is used for a feedback control of the output of the semiconductor lasers 101 through 108.

The main light flux reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the flux in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main light flux transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIG. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main flux transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main flux reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the light flux that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the fold-over mirror 200 side. The surfaces of the lens are designed such that the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 480 side and a convex toric surface on the fold-over mirror 200 side. The surfaces of the lens are designed such that the second lens 193 has a comparatively large positive (i.e. more positive) power in the auxiliary scanning direction and a comparatively small positive power in the main scanning direction.

The third lens 195 is a positive meniscus lens having two spherical surfaces.

The fourth lens 197 is a negative meniscus lens having two spherical surfaces.

The main flux transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the light fluxes reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight fluxes are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11, which permits the main flux (including the eight individual fluxes) reflected by the fold-over mirror 200 to be transmitted to the photoconductive drum 210, is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by a cover plate 13 in normal use.

Figure 5:
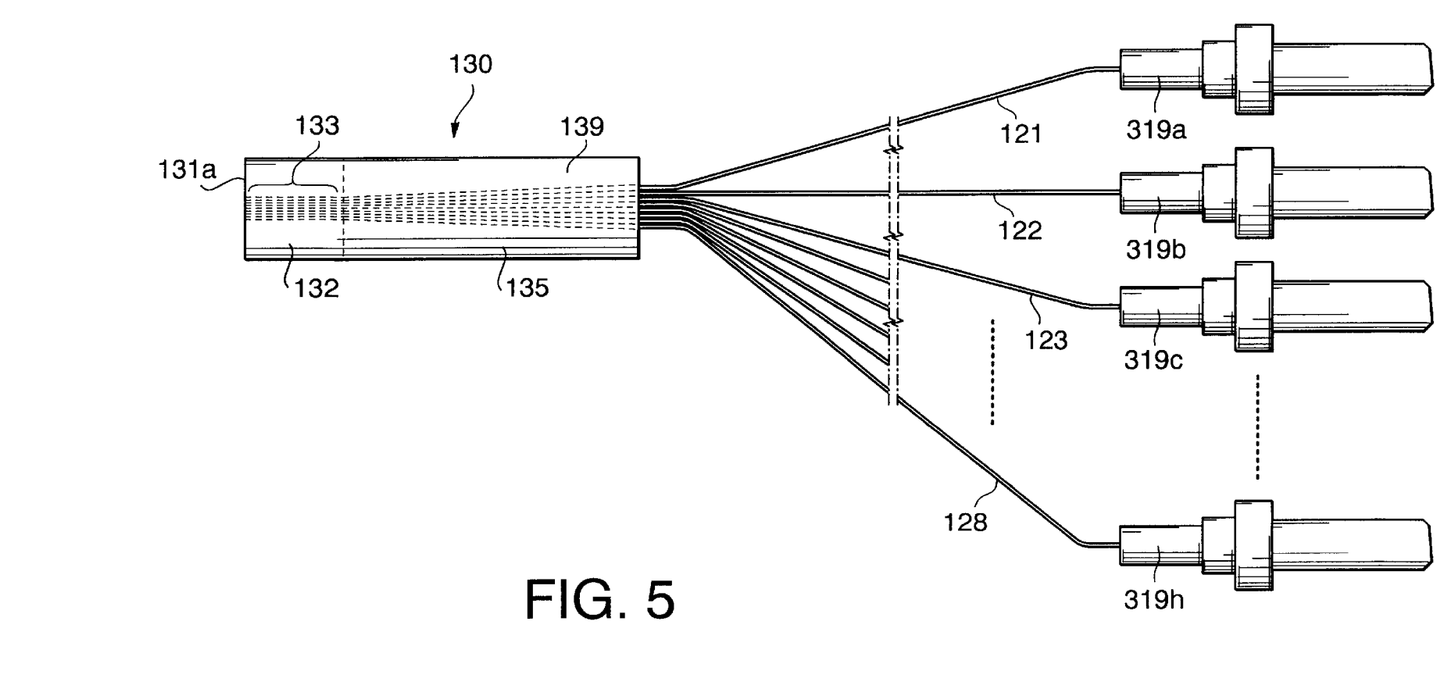
FIG. 5 is a plan view showing the elements from a fiber supporting member to a fiber alignment block.
Figure 6:
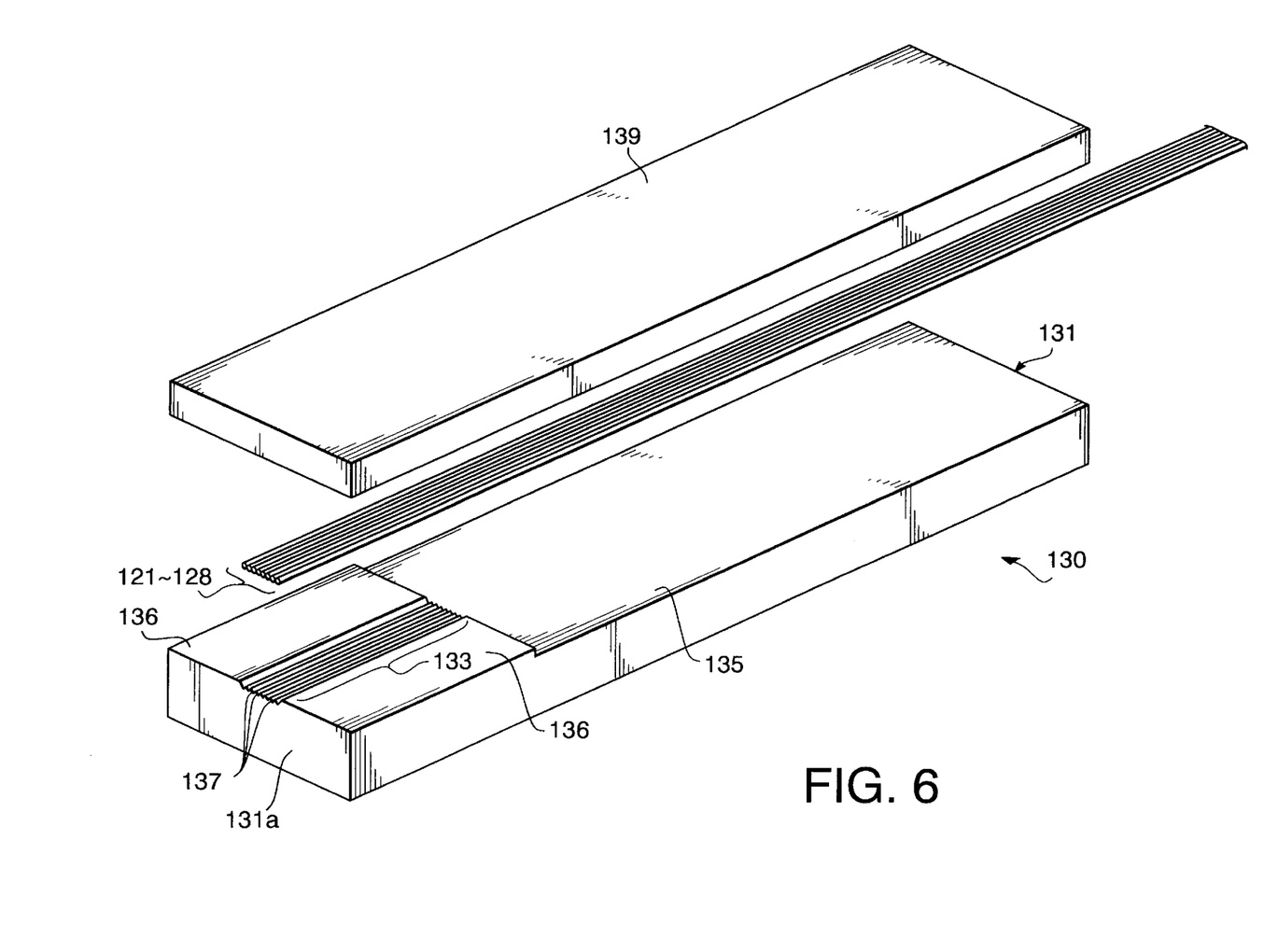
FIG. 6 is an exploded view of the fiber alignment block.

As shown in FIG. 5, the exit end portions of the optical fibers 121 through 128 are aligned by the fiber alignment block 130. The center axes of the respective optical fibers 121 through 128 are positioned in a straight row. FIG. 6 is an exploded view of the fiber alignment block 130. As shown in FIG. 6, an alignment portion 133 to position the exit end portions of the optical fibers 121 through 128 is formed in a body 131, and a pressing plate 139 presses the optical fibers 121 through 128 to the body 131. An introduction portion 135 is formed at the block entry side from the alignment portion 133 of the body 131 to provide a staging gap entering between the pressing plate 139 and the body 131.

Figure 7:
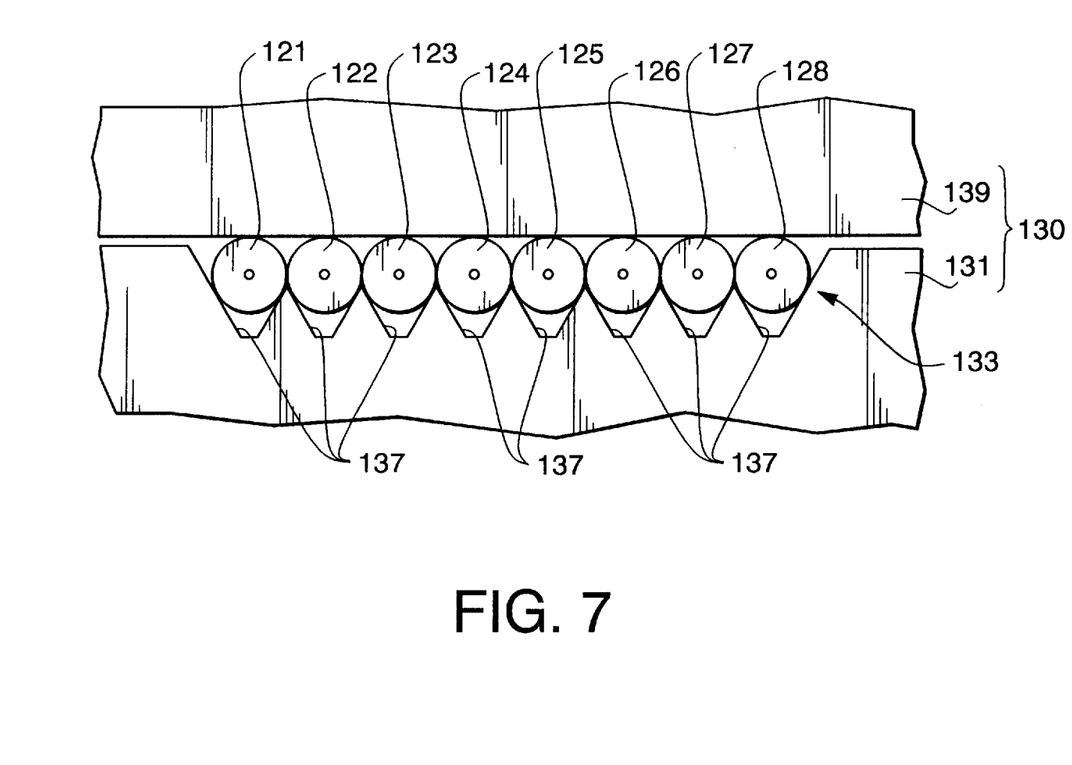
FIG. 7 is an enlarged front view of the fiber alignment block.

As shown in FIGS. 6 and 7, eight parallel V-shaped grooves 137 corresponding to the optical fibers 121 through 128 respectively are formed at the alignment portion 133. The depth of each of the V-shaped grooves 137 is such that each of the optical fibers 121 through 128 protrude slightly above the alignment portion 133 and can be pressed by the pressing plate 139.

Preferably, the body 131 of the fiber alignment block 130 is made of a substance having a hardness that is lower than that of the optical fibers 121 through 128, for example, plastic, and the pressing plate 139 is made of a substance having a hardness that is higher than that of the body 131, for example, glass. During assembly, each of the fibers 121 to 128 are set in the respective grooves 137, an adhesive is added, and the fibers are then tightly pressed by the pressing plate 139. In this process, the fibers 121 to 128 are pressed into the grooves 137 and the grooves 137 deform as necessary to form around the fibers 121 to 128. The optical fibers 121 through 128 and the fiber alignment block 130 are thus integrally fixed by the adhesive between the body 131 and the pressing plate 139. In this way, the pressing plate 139 can be formed having a flat surface that becomes a reference plane against which the optical fibers are pressed. Since it is easier to manufacture a high-tolerance flat surface than high-tolerance grooves, the use of the harder pressing plate 139 and the softer grooves 137 and body 131 allows the accuracy of the V-shaped grooves 137 to have a wider range of design parameters (allowance) while maintaining the accuracy of the alignment of the optical fibers 121 to 128.

Figure 8:
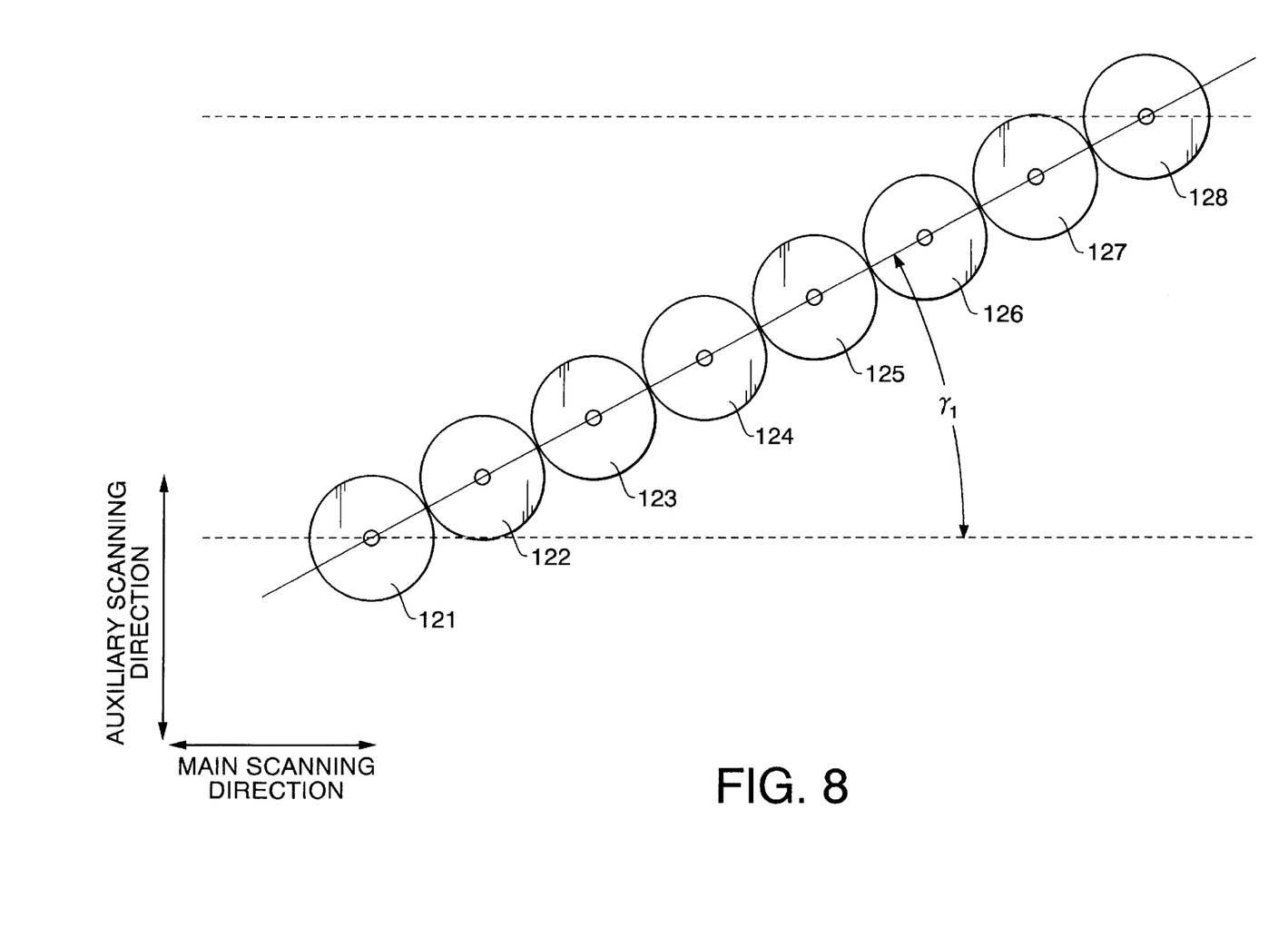
FIG. 8 is an explanatory view showing an array of fibers.

As shown in FIG. 8, the exit end surfaces of the optical fibers 121 through 128, retained at the fiber alignment block 130, are arranged so that their center axes are in a straight line. That is, axes of respective exit end portions of the optical fibers 121 through 128 are parallel with each other and aligned on a flat plane. The fiber alignment block 130 is retained by a holder (not shown) and is diagonally set, so that the straight line connecting the center axes of the fibers 121 trough 128 forms a predetermined angle γ1 with respect to the main scanning direction. At the predetermined angle γ1, the beam spots on the photoconductive drum 210 form an array, separated from each other by a predetermined distance in the main scanning direction and in the auxiliary scanning direction.

Figure 9:
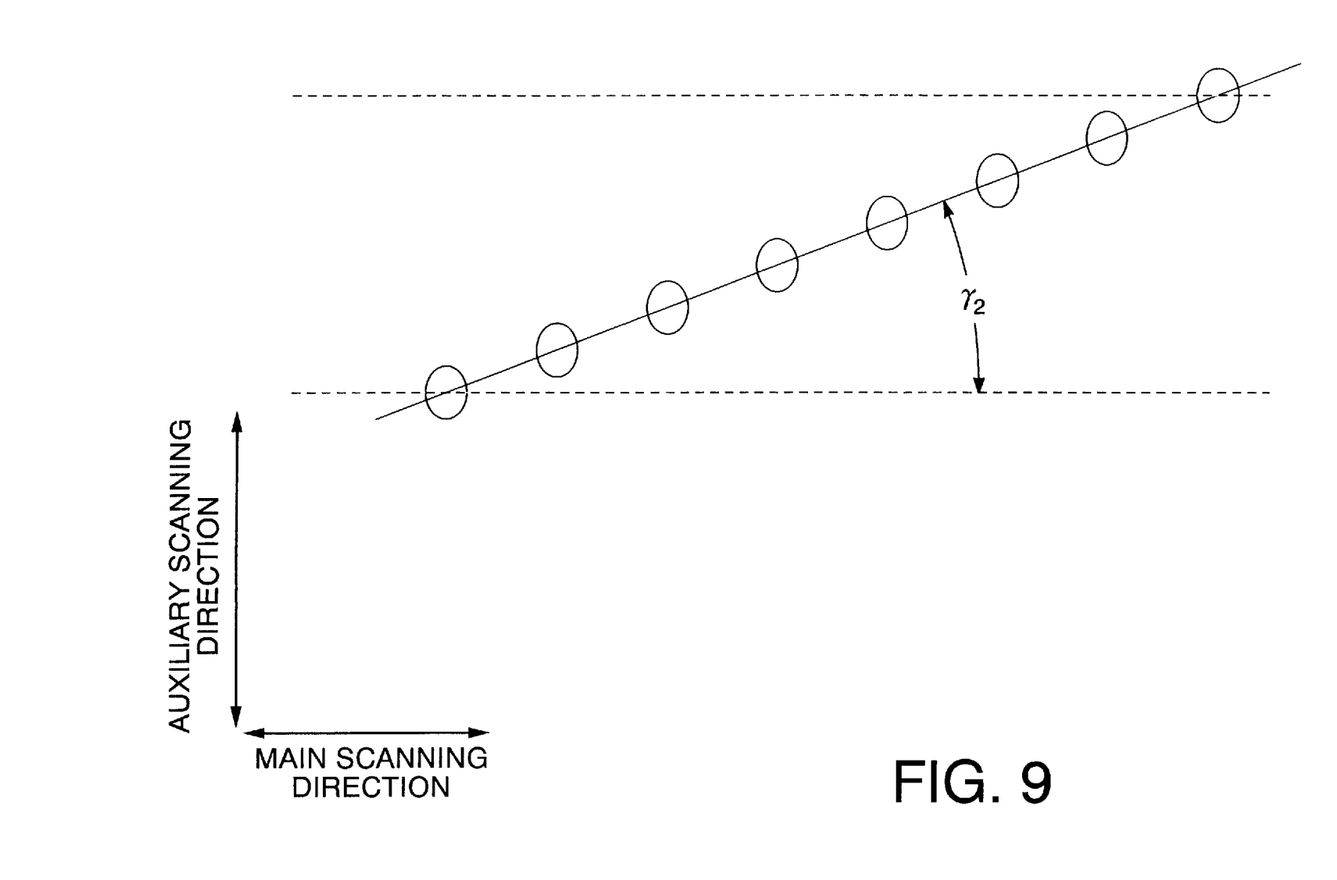
FIG. 9 is an explanatory view showing an array of beam spots on a photoconductive drum.

FIG. 9 shows the array of beam spots formed on the photoconductive drum 210. If the optical fibers 121 through 128 (corresponding to object points) are arrayed as shown in FIG. 8, the beam spots form with their centers in a straight line that forms a predetermined angle γ2 with respect to the main scanning direction. In this way, the centers of the beam spots are separated by a predetermined distance in the auxiliary scanning direction such that scan lines formed in the main scanning direction can be slightly overlapped.

In the scanning optical device, the inclination angle γ1 (shown in FIG. 8) of the point light source array with respect to the main scanning direction must be accurately adjusted because the inclination angle γ1 determines the space between the scanning lines in the auxiliary scanning direction. For example, if the inclination angle γ1 is larger than a predetermined figure, a space between the eight scanning lines per scan in the auxiliary scanning direction will be larger. Furthermore, if the inclination angle γ1 is smaller than the predetermined figure, a space between one set of eight scanning lines and the set of eight scanning lines adjacent thereto will be larger for a predetermined rotation speed of the photoconductive drum 210. In either case, the quality of the formed image will be lower.

As a particular numerical example, using a point light source array in which eight optical fiber exit end surfaces 121b through 128b are arranged in a width of about 900 μm at an inclination angle γ1 with respect to the main scanning direction of 5.34 degrees, it is necessary to adjust the inclination angle γ1 of the point light source array by units of 0.05 degrees (1/1000 radian) in order to maintain the quality of the formed image.

In the present embodiment, the exit end surfaces 121b through 128b are positioned in a straight line by the fiber alignment block 130 (FIG. 7), such that the inclination angle γ1 of the point light source array can be adjusted with respect to the main scanning direction by adjusting the inclination angle of the fiber alignment block 130.

Figure 10:
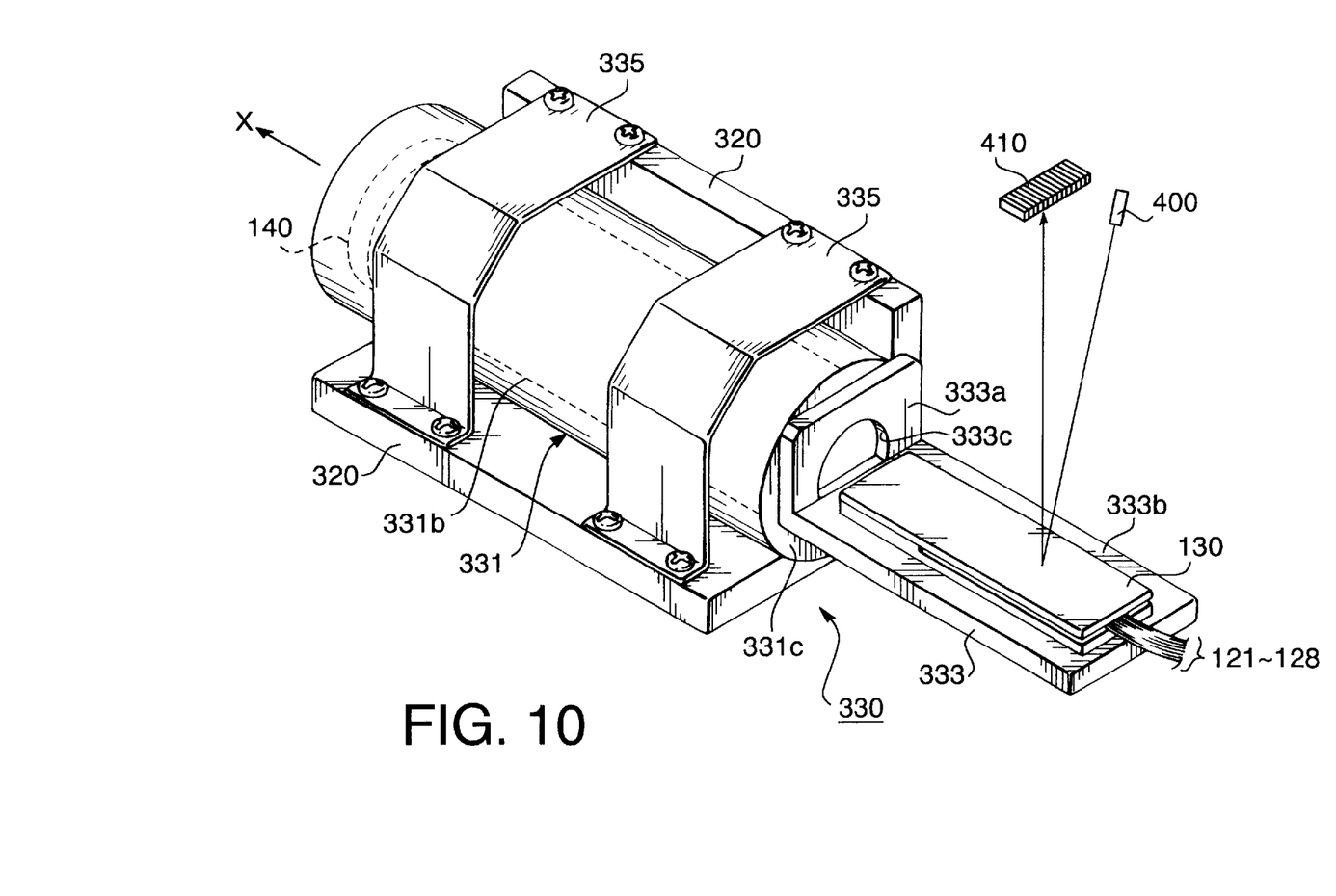
FIG. 10 is a perspective view of a fiber alignment block holder.

Thus, as shown in FIG. 10, the scanning optical device is provided with a fiber alignment block holder 330 that rotatably supports the fiber alignment block 130.

The fiber alignment block holder 330 includes an L-shaped base 320 attached to the casing 1, a cylindrical member 331 supported by the L-shaped base 320, an attaching portion 333 fixed to the cylindrical member 331 to hold the fiber alignment block 130, and fixing members 335 to fix the cylindrical member 331 to the L-shaped base 320.

The cylindrical member 331 defines a circular hole 331b that passes through the center of the cylindrical member 331.

The attaching portion 333 is mounted at one end face 331c of the cylindrical member 331. The attaching portion 333 is formed to have an L-shape, including a perpendicular portion 333a that is fixed to the end face 331c of the cylindrical member 331 and a horizontal member 333b that extends from the end face 331c of the cylindrical member 331 parallel to the center axis of the cylindrical member 331. The perpendicular portion 333a is formed having a hole 333c which coincides with the hole 331b through the cylindrical member 331.

The L-shaped base 320 is provided with two surfaces that are orthogonal to each other. The cylindrical member 331 is held in place in the corner of the L-shaped base 320 by fixing members 335. Thus, the cylindrical member 331 is arranged such that the center thereof is a rotation axis about which the cylindrical member 331 can be rotated when the fixing members 335 are slackened.

The fiber alignment block 130 is fixed to the horizontal member 333b of the attaching portion 333 such that the center of the point light source array is coincident with the rotating axis of the cylindrical member 331. Therefore, by rotating the cylindrical member 331, the fiber alignment block 130 is also rotated around the center of the point light source array.

In the present embodiment, if, as a numerical example, the outer diameter of the cylindrical member 331 is 22 mm, an inclination angle of 0.05 degree (1/1000 radian) corresponds to a length of 10 μm in the outer circumferential direction of the cylindrical member 331. Accordingly, it is comparatively easy to adjust in units of 0.05 degree for the inclination angle γ1. Thus, according to the present embodiment, it is possible to very accurately adjust the inclination angle γ1 of the point light source array with respect to the main scanning direction by rotating the comparatively large-diametered cylindrical member 331 of the fiber alignment block holder 330.

Furthermore, a collimate lens 140 is attached to the cylindrical member 331 at the opposite end to the attaching portion 333. When the cylindrical member 331 is rotated, the collimate lens 140 is rotated accordingly. That is, the exit end surfaces 121b through 128b of the optical fibers 121 to 128 and the collimate lens 140 are both attached to the cylindrical member 331 such that the position thereof in the optical axis direction is aligned during assembly. Thereby, the positional relationship of the exit end surfaces 121b to 128b and the collimate lens 140 in the optical axis direction is always kept constant regardless of the rotating angle of the cylindrical member 331.

Figure 11:
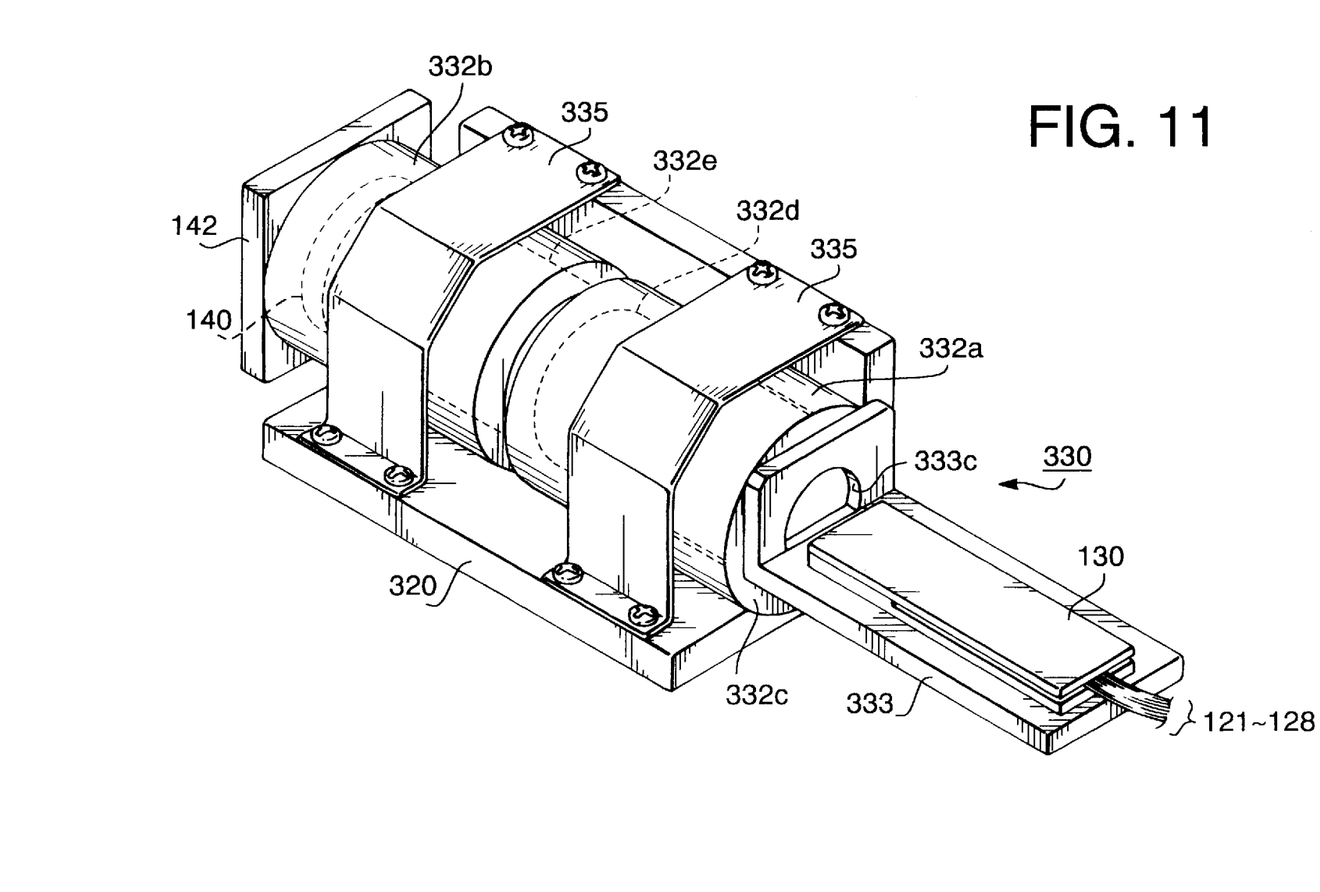
FIG. 11 is a perspective view of an alternative fiber alignment block holder.

An alternative fiber alignment block holder 330 may be arranged as shown in FIG. 11. In this alternative arrangement, the fiber alignment block 130 and the collimate lens 140 are respectively attached to two independently rotatable cylindrical portions 332a, 332b. The cylindrical portions 332a and 332b define central holes 332d and 332e respectively. In this case, the perpendicular portion 333a of the attaching portion 333 is fixed to the end face 332c of the cylindrical portion 332a. In this case, if the cylindrical portion 332a is rotated to adjust the inclination angle of the fiber alignment block 130, the collimate lens 140 is not also rotated.

In this case, the aperture 142 is attached to the cylindrical portion 332b to function integrally with the collimate lens 140. In this alternative arrangement, the aperture 142 can be integral with the collimate lens 140 since the aperture 142 will remain in the same positional relationship with respect to the main scanning direction and auxiliary scanning direction.

A method for sensing the inclination angle γ1 of the point light source array is described with reference to FIG. 10. As shown in FIG. 10, a laser source 400 and a sensor 410 are positioned above the fiber alignment block 130. The sensor 410 includes minute light receiving elements arranged in a straight line to detect a position of incident light flux on the surface of the sensor 410. The upper surface of the fiber alignment block 130 is coated by a reflective coating.

The laser flux from the laser source 400 is reflected by the upper surface of the fiber alignment block 130 toward the sensor 410. With this arrangement, if the inclination angle γ1 of the fiber alignment block 130 changes, the reflection angle of the reflected flux is also changed. In particular, the sensor 410 is arranged such that the sensor 410 is able to detect the reflected flux within a predetermined range and the rotating angle of the fiber alignment block 130 can be detected accordingly.

In the above sensor arrangement, although the upper surface of the fiber alignment block 130 is utilized as a reflection surface, the reflection surface may be provided at any place which rotates with the cylindrical member 331. For example, it is also possible to form a reflection surface on the cylindrical member 331 itself.

Furthermore, a method for adjusting the inclination angle γ1 of the point light source array (i.e. the fiber alignment block 130) with respect to the main scanning direction is not limited to the above method. It is also possible to rotate and adjust the cylindrical member 331 while measuring the inclination of the array of beam spots on the image forming plane.

According to the above arrangement and sensing method, the inclination angle of a point light source array can be very accurately adjusted.

The present disclosure relates to subject matter contained in Japanese Patent Application No. HEI 8-037269, filed on Jan. 31, 1996, which is expressly incorporated herein by reference in its entirety.

What is claimed is:

1. A holder for optical fibers in a scanning optical device, comprising:

a fiber alignment block that holds exit end portions of aid optical fibers, such that exit end surfaces of said optical fiber are linearly aligned on an alignment line;

a cylindrical member to which said fiber alignment block is fixed, wherein central axes of said exit end portions of said optical fibers are parallel to a generatrix of said cylindrical member; and a supporting member that rotatably supports said cylindrical member about a rotating axis parallel to said generatrix of said cylindrical member.

2. The holder for optical fibers according to claim 1, wherein axes of respective exit end portions are parallel with each other and aligned on a flat plane.

3. The holder for optical fibers according to claim 1, wherein the center of said fibers on said alignment line substantially coincide with said rotating axis.

4. The holder for optical fibers according to claim 3, wherein said cylindrical member defines a circular hole along said rotating axis, such that light fluxes from said optical fibers pass through said circular hole.

5. The holder for optical fibers according to claim 4, wherein said cylindrical member further holds a collimator lens in said circular hole, such that said light fluxes are transmitted through said collimator lens.

6. The holder for optical fibers according to claim 1, wherein said supporting member includes a base member that contacts with said cylindrical member and a fixing member that fixes said cylindrical member to said base member.

7. The holder for optical fibers according to claim 6, wherein said base member comprises two contact surfaces that are perpendicular to each other and wherein said cylindrical member contacts with both of said contact surfaces.

8. A multi-beam scanning optical device, comprising:

a plurality of light emitting elements;

a plurality of optical fibers that transmit light fluxes emitted from said light emitting elements of said plurality of light emitting elements;

a fiber alignment block that holds exit end portions of said optical fibers, said plurality of optical fibers being held such that the exit end surfaces of said plurality of optical fibers are linearly aligned;

a cylindrical member to which said fiber alignment block is fixed, wherein a direction of exit light fluxes from said optical fibers are parallel to a generatrix of said cylindrical member;

a supporting member that supports said cylindrical member so as to allow a rotation of said cylindrical member about a rotating axis parallel to said generatrix of said cylindrical member;

a deflector that deflects said light flux transmitted through said plurality of optical fibers; and a scanning lens system that converge said deflected light flux to form a scanning line on an image surface.

9. The holder for optical fibers according to claim 8, wherein axes of respective exit end portions are parallel with each other and aligned on a flat plane.

10. The scanning optical device according to claim 8, wherein a center of said plurality of optical fibers on said fiber alignment block substantially coincides with said rotating axis.

11. The scanning optical device according to claim 8, wherein said cylindrical member is provided with a circular hole along said rotating axis so that light fluxes passes through said circular hole.

12. The scanning optical device according to claim 8, wherein said supporting member includes a base member that contacts with said cylindrical member and a fixing member that fixes said cylindrical member to said base member.

13. The scanning optical device according to claim 12, wherein said base member comprises two contact surfaces that are perpendicular to each other and wherein said cylindrical member contacts with both of said contact surfaces.

14. The scanning optical device according to claim 8, further comprising an angle detecting unit, said angle detecting unit including a reflecting surface that rotates with said cylindrical member, a light source for emitting a detection light toward said reflecting surface and a photodetector to detect a position of the reflected light from said reflecting surface.

* * * * *

UNITED STATES PATENT AND TRADEMARK OFFICE
CERTIFICATE OF CORRECTION

PATENT NO. : 5,812,727
DATED : September 22, 1998
INVENTOR(S) : Hiroshi KANAZAWA et al.

It is certified that error appears in the above-identified patent and that said Letters Patent is hereby corrected as shown below:

At column 9, line 46 (claim 1, line 3) of the printed patent, "portions of aid" should be ---portions of said---.

Signed and Sealed this

Eighth Day of February, 2000

Attest:

Q. TODD DICKINSON

Attesting Officer

Commissioner of Patents and Trademarks